Patented Aug. 12, 1952

2,606,908

UNITED STATES PATENT OFFICE 2,606,908

BASIC DIOXOLANES

Frederick F. Blicke, Ann Arbor, Mich., assignor to Regents of The University of Michigan, Ann Arbor, Mich., a corporation of Michigan No Drawing. Application April 5, 1950, Serial No. 154,191

4 Claims. (Cl. 260—338)

This invention relates to new compositions of matter having valuable therapeutic properties, and more specifically to new substituted basic dioxolanes.

The chemical structure of the new compounds is characteristically that of 1,3-dioxolane with one or more cyclic structures substituted at the 2-position and a substituted amino ethoxymethyl residue at the 4-position as shown in the structural formula

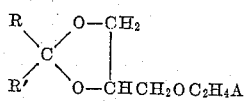

in which the group RR'C may be regarded as the residue of a chain ketone having one or more ring structures in the chain, or a cyclic ketone residue; and in which A represents a secondary or tertiary amino group linked through its nitrogen. Hence RR'C may be the residue of an aromatic ketone, or a mixed aromatic ketone having an aromatic group or a grouping of similar structural character attached to one side of the C-atom and an aliphatic, alicyclic or heterocyclic group attached to the other side. Moreover, the ketone residue, RR'C, may constitute a single carbocycle or heterocycle, or a bridged hydrocarbon or heterocyclic configuration with C forming the common member of a spiro ring system. The amino group, A, is the residue of an aliphatic or alicyclic primary or secondary amine where the hydrocarbon substituent or substituents are of relatively low molecular weight, or of a cyclic imine. In the last category are comprehended polymethylenimines where the imino nitrogen is a ring member of a heterocycle possessing the character of a secondary amine; e. g., pyrrolidine, pyrazolidine, pyrroline, piperidine. The cyclic imine may contain hetero members other than nitrogen as in, for example, morpholine.

The new compounds possess useful properties as histamine antagonists and antispasmodics, combining a high degree of effectiveness with low toxicity. Many are high boiling liquids. As bases they form acid addition salts; e. g. with hydrochloric, sulfuric, succinic and malic acids. Likewise, the new substituted dioxolane bases form quaternary ammonium compounds, e. g., methiodide, ethobromide, and benzylbromide quaternary salts by alkyl or aralkyl halide addition. The acid addition salts and the quaternary ammonium salts, in general, are relatively soluble, crystalline solids and are valuable for the purposes of this invention. The new compounds may be used in the form of water or oil solutions or as the salts or quaternary ammonium compounds.

An advantageous method of preparing the new compounds is by a two-step process involving initially the production of the corresponding 2,2 - substituted-4-hydroxymethyl-1,3-dioxolane, in turn obtained from the corresponding di-substituted dimethoxymethane and glycerin, followed by condensation of the substituted 4-hydroxymethyl-dioxolane with an amino substituted $\beta$-aminoethyl halide, advantageously chloride, using sodium as the condensing agent, with elimination of sodium chloride.

The first reaction is readily carried out by heating the di-substituted dimethoxymethane with anhydrous glycerol, distilling off the methanol formed. The second step is advantageously carried out by refluxing the disubstituted 4-hydroxymethyl-1,3-dioxolane with sodium in an inert solvent, followed by heating the mixture of solvent and sodium compound with the amino substituted $\beta$-amino ethyl chloride, advantageously by refluxing.

The di-substituted dimethoxymethanes used as starting materials for producing the compounds of this invention may be regarded as ketals corresponding to ketones which are cyclic in structure with the carbonyl group either forming a part of the ring structure or having one or more rings directly attached to form a ring-membered chain. Various sub-classes of the new substituted basic dioxolanes are defined according to the shape, structural configuration, molecular size and weight, and the relative aromaticity or aliphatic character of the ketal starting materials. Among the available compounds are those corresponding to the aromatic ketones such as the diaryl ketones, in which benzene or naphthalene rings are directly attached to the carbonyl group, such as benzophenone and equivalent substituted diphenyl ketones, where the substituents are of a non-toxic character. Ketals corresponding to mixed aliphatic-aromatic ketones provide another group of aromatic ketone starting materials. The aliphatic group may be straight or branched chain in structure, including, for example, methyl, ethyl, propyl, isopropyl, butyldiethylcarbinyl and ethylbutylcarbinyl. Other ketals are those corresponding to mixed aromatic-alicyclic ketones, e. g., where one group is phenyl or substituted phenyl and the other group is cyclohexyl or other cycloalkylene radical. Ketals corresponding to mixed ketones of the aryl-heterocyclic type may also be utilized with advantage. Available heterocycles include, for example, thiophene, pyridine, piperidine and the pyrimidines, with the keto linkage ordinarily positioned alpha to the key hetero atom. Also those ketals corresponding to those mixed ketones having a conjugated or aromatic-type heterocycle attached to one side of the carbonyl group and an aliphatic chain or ring attached to the other side may be considered as useful equivalents for the mixed aromatic ketones.

The ketals corresponding to ketones in which the keto or carbonyl group forms part of the ring structure, so that the dioxolane has a multiple ring structure (spiran) linked at the 2-position, are also useful. Thus, ketals corresponding to ketones of single, fused or branched carbocyclic and heterocyclic structure are suitable, such as the ketals corresponding to cyclopentanone and cyclohexanone as well as the cyclic terpenes and camphors. Multiple ring or spiro dioxolanes of advantage may also be produced from ketals corresponding to ketones of branched aryl structure, i. e., where the two aryl groups of themselves branched or linked directly or by bridging atoms of groups such as —NH—, —NR—, —O—, —S—, —CH$_2$—. Among the bridged compounds which are useful are the ketals corresponding to xanthone, fluorenone, thioxanthone, N-methylacridone.

The aminoethylchlorides available for the production of the new compounds are essentially compounds in which one or two of the amino hydrogens other than that linked to the —C$_2$H$_4$Cl group are substituted by aliphatic or alicyclic groups of relatively low molecular weight. Where both of the hydrogens are replaced by such groups, the substituent groups may be the same or different, and in either case the alkyl groups may be straight or branched chain residues. In addition to the aliphatic and alicyclic amino ethyl chlorides, the cyclic imino ethyl chlorides or polymethylene imino ethyl chlorides are useful for introducing the amino ethoxy group. These compounds may contain other nitrogen or other hetero atoms in the ring in addition to the nitrogen of the imino group and may be of single ring or fused ring structure. The heterocyclic structure is, however, united to the dioxolane ring through a ring-membered imino nitrogen atom in turn linked to the beta carbon of the ethoxy group.

The preparation of the new compounds will be illustrated by the following specific examples but the invention is not limited thereto.

*Example I*

2,2 - diphenyl - 4 - (β - dimethylaminoethoxymethyl)-1,3-dioxolane.—A mixture of 50 parts (0.21 mole) of diphenyldimethoxymethane and 26.2 parts (0.284 mole) of anhydrous glycerol was heated in a distillation apparatus for eight hours at 250° C. (bath temperature). During this time 13.4 parts of methanol distilled. The reaction mixture was distilled in vacuo. The product, which boiled at 133°–137° C. (uncorr.) at 0.01 mm., solidified on cooling. Recrystallized from petroleum ether (90–100°), it melted at 51–52° C. (uncorr.).

Ten parts (0.039 mole) of the 2,2-diphenyl-4-hydroxymethyl-1,3-dioxolane, 1.8 parts of sodium metal and 30 parts of dry toluene were refluxed for four hours. The mixture was decanted from the excess sodium and 4.2 parts (0.039 mole) of freshly distilled β-dimethylaminoethyl chloride were added. After four hours of refluxing the solution was washed with water until neutral. Removal of the toluene left 7.9 parts of impure, oily amine.

The hydrochloride was obtained by treating a solution of 4.5 parts of the oily residue in 400 parts of anhydrous ether with 0.0138 mole of ethereal hydrogen chloride. The oily hydrochloride crystallized after 9 days of refrigeration. Recrystallization from dry acetone-anhydrous ether yielded 2.15 parts of hygroscopic product which melted at 95–97° C. (uncorr.).

The methiodide was obtained by heating a mixture of 3.3 parts (0.0101 mole) of the oily amine, 14.3 parts (0.101 mole) of methyl iodide and 35 parts of dry chloroform in a pressure bottle at 100° C. for five hours. After removal of the solvent, the residue was rubbed under dry ether until solid. Recrystallization from dry acetone-ether yielded 2.1 parts of methiodide, M. P. 140–141° C. (uncorr.).

*Example II*

2,2 - diphenyl - 4 - (β - diethylaminoethoxymethyl)-1,3-dioxolane.—This compound was prepared by the procedure described in Example I from the 2,2-diphenyl-4-hydromethyl-1,3-dioxolane and β-diethyl aminoethyl chloride. The hygroscopic hydrochloride obtained on recrystallization from a mixture of toluene and petroleum ether melted at 80–82° C. (uncorr.).

The compounds of the examples antagonized the effects of histamine on isolated, smooth muscle strips at high dilutions, and antagonized the effect of acetyl choline and barium chloride in high dilutions, also. The compounds are effective antispasmodics and have antihistaminic properties. They form very slightly soluble salts with penicillin which are useful for parenteral administration of penicillin, not only providing slow release of the penicillin into the blood stream but also, because of the antihistaminic action of the dioxolane structure, assisting in overcoming allergic manifestations sometimes associated with penicillin administration.

Other 2,2 - di-substituted-4-aminoethoxymethyl-1,3-dioxolanes which exemplify the compounds of this invention are:

2,2-diphenyl-4-(1 - piperidyl-ethoxymethyl - 1,3-dioxolane;

2 - phenyl-2-thienyl-4-diethylaminoethoxymethyl-1,3-dioxolane;

2 - phenyl-2-pyridyl-4-diethylaminoethoxymethyl-1,3-dioxolane;

2,2-diphenylene - 4 - diethylaminoethoxymethyl-1,3-dioxolane;

2-phenyl-2-cyclohexyl - 4 - diethylaminoethoxymethyl-1,3-dioxolane;

2-phenyl-2-isopropyl - 4 - diethylaminoethoxymethyl-1,3-dioxolane;

2-phenyl-2-diethylcarbinyl - 4 - diethylaminoethoxymethyl-1,3-dioxolane;

2-phenyl-2-ethylbutylcarbinyl - 4 - diethylaminoethoxymethyl-1,3-dioxolane;

Spiro[4-diethylaminoethoxymethyl - 1,3 - dioxolane-2,9'-xanthene];

Spiro[4-diethylaminoethoxymethyl - 1,3 - dioxolane-2,9'-thiaxanthene];

Spiro[4-diethylaminoethoxymethyl - 1,3 - dioxolane-2,9'-thiaxanthene-10'-dioxide];

Spiro[4-diethylaminoethoxymethyl - 1,3 - dioxolane-2,9'-acridan];

Spiro[4-diethylaminoethoxymethyl - 1,3 - dioxolane-2,2'-bicyclo (3.1.0) - 1'-methyl-4'-isopropyl-hexane];

Spiro[4-diethylaminoethoxymethyl - 1,3 - dioxolane-2,9'-(N-methyl) acridan];

Spiro[4-diethylaminoethoxymethyl - 1,3 - dioxolane-2,9'-dihydroanthracene];

2,2 - diphenyl - 4 - isopropylaminoethoxymethyl-1,3-dioxolane;

2-phenyl-2-thienyl - 4 - isopropylaminoethoxymethyl-1,3-dioxolane;

2,2-diphenyl - 4 - cyclohexylaminoethoxymethyl-1,3-dioxolane;

2,2-diphenyl - 4 - (morpholyl) ethoxymethyl-1,3-dioxolane;

2 - phenyl - 2 - pyridyl - 4 - (morpholyl) ethoxymethyl-1,3-dioxolane;

Spiro[4-(morpholyl) ethoxymethyl - 1,3 - dioxolane-2,9'-thiaxanthene];

2,2-diphenyl - 4 - (1 - pyrrolidyl) ethoxymethyl-1,3-dioxolane;

2,2-diphenylene - 4 - isopropylaminoethoxymethyl-1,3-dioxolane.

I claim:

1. Basic dioxolanes represented by the structural formula

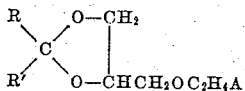

in which RR'C taken together represent a radical of the class consisting of lower cycloalkyl radicals, and in which R is a radical selected from the group consisting of lower alkyl, lower cycloalkyl, naphthalyl, phenyl, pyridyl, piperidyl, pyrimidyl and thienyl radicals, and R' is a radical selected from the group consisting of phenyl, naphthalyl, pyridyl, piperidyl, pyrimidyl and thienyl radicals, and in which R and R' are phenyl radicals and are bridged by a member selected from the group consisting of nitrogen, oxygen, sulfur and methylene, and in which R and R' taken together are a diphenylene radical, and in which A is a radical selected from the group consisting of secondary and tertiary lower alkylamino radicals, secondary and tertiary lower cycloalkylamino radicals, mixed lower alkyl-lower cycloalkyl tertiary amino radicals, cyclic polymethylenimino radicals, and a morpholyl radical.

2. Compounds as in claim 1 in which R and R' are phenyl.

3. Compounds as in claim 1 in which R and R' are phenyl and A is dimethylamino.

4. Compounds as in claim 1 in which R and R' are phenyl and A is diethylamino.

FREDERICK F. BLICKE.

REFERENCES CITED

The following references are of record in the file of this patent:

UNITED STATES PATENTS

| Number | Name | Date |
|---|---|---|
| 2,384,607 | De Groote | Sept. 11, 1945 |
| 2,439,969 | Fourneau | Apr. 20, 1948 |
| 2,445,393 | Fourneau | July 20, 1948 |
| 2,504,098 | Morris | Apr. 18, 1950 |

OTHER REFERENCES

Enzynologia, vol. 12, p. 301 (1948).

Nature, page 481, March 27, 1948.